(No Model.) 2 Sheets—Sheet 1.

E. CLIFF.
VEHICLE SPRING.

No. 401,135. Patented Apr. 9, 1889.

WITNESSES:
J. J. Laass
H. B. Smith

INVENTOR
Edward Cliff
BY
Duell, Laass & Duell
ATTORNEYS (No Model.) 2 Sheets—Sheet 2.

E. CLIFF.
VEHICLE SPRING.

No. 401,135. Patented Apr. 9, 1889.

WITNESSES:
J. J. Laass
H. B. Smith

INVENTOR:
Edward Cliff
BY
Duell, Laass & Duell
ATTORNEYS

UNITED STATES PATENT OFFICE.

EDWARD CLIFF, OF NYACK, NEW YORK.

VEHICLE-SPRING.

SPECIFICATION forming part of Letters Patent No. 401,135, dated April 9, 1889.

Application filed December 8, 1888. Serial No. 292,994. (No model.)

*To all whom it may concern:*

Be it known that I, EDWARD CLIFF, of Nyack, in the county of Rockland, in the State of New York, have invented new and useful Improvements in Vehicle-Springs, of which the following, taken in connection with the accompanying drawings, is a full, clear, and exact description.

This invention consists in a novel construction of an elliptic spring, which is comparatively simple and inexpensive to manufacture, and when subjected to a load it relieves to a great extent the couplings of the ends of the spring from strain, and at the same time the spring becomes re-enforced and stiffened correspondingly by the two members of the spring coming to bearings upon each other nearer the center of the spring, in combination with the saddle mounted on said elliptic spring, and a bearing terminating in proximity to said central attachment, and thus allowing the spring to exert its elasticity nearly throughout its entire length, all as hereinafter more fully described, and specifically set forth in the claim.

Figure 1:
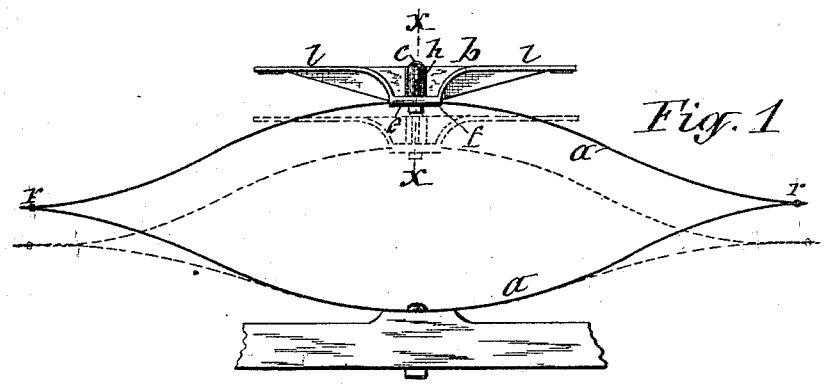
Figure 2:
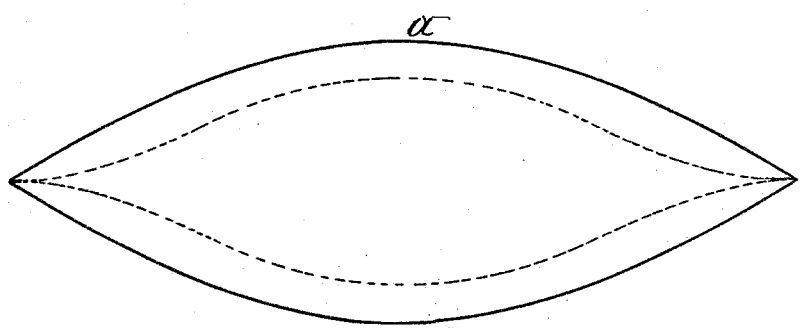
Figure 3:
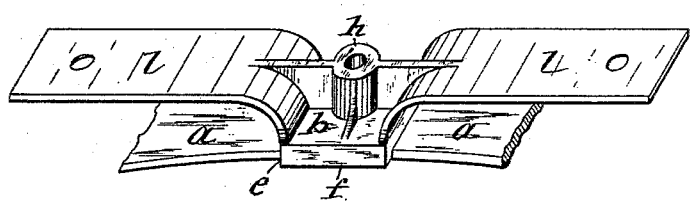
Figure 4:
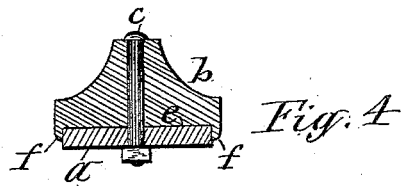
Figure 5:
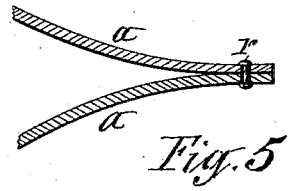
Figure 6:
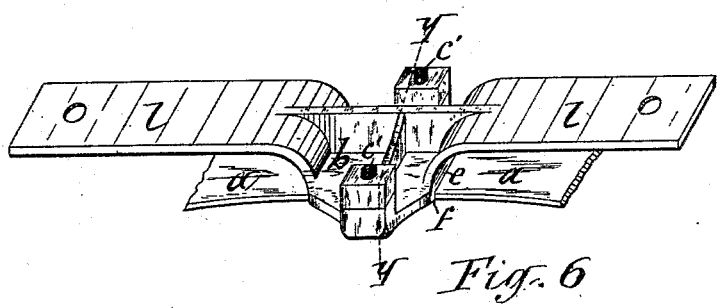
Figure 7:
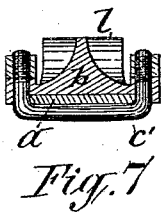

In the annexed drawings, Figure 1 is a side elevation of a spring embodying my invention, the dotted lines illustrating the action of the spring when subjected to a load. Fig. 2 is a side view of the manner of connecting the upper and lower members of my improved elliptic spring. Fig. 3 is an enlarged perspective view of one of the saddles or head-blocks of the spring. Fig. 4 is an enlarged transverse section on line $x\,x$, Fig. 1. Fig. 5 is an enlarged longitudinal section of one of the end portions of the spring. Fig. 6 is a perspective view of a modification of said saddle; and Fig. 7 is a transverse section on line $y\,y$, Fig. 6.

Similar letters of reference indicate corresponding parts.

$a\,a$ represent the two leaves composing the elliptic spring. In forming this spring I impart to the said leaves a normally excessively curved or crowning shape, as represented by full lines in Fig. 2 of the drawings, and then firmly unite the end portions of said leaves, so as to cause them to lie contiguously to each other from the ends a short distance toward the center, and thus cause the end portions to be bent reverse from the central portion of the leaves, as shown by dotted lines in the aforesaid figure. The union of the end portions of the leaves $a\,a$, I prefer to effect by perforating the same and drawing them together by means of bolts or rivets $r$, passing through the said perforations, as illustrated in Fig. 5 of the drawings. Inasmuch as the said rivets are normally subjected to a tensile strain, it is obvious that when the spring becomes compressed by a load said rivets are to a great extent relieved of the aforesaid strain; and, furthermore, in compressing the spring the reversely-curved end portions of the two leaves of the spring come to bearings upon each other nearer to the center of the spring, as illustrated by dotted lines in Fig. 1 of the drawings, and the reduction of the distance between the two end bearings causes the spring to be stiffened or re-enforced, according to the degree of compression.

$b$ represents a saddle or head-block composed of malleable iron or other suitable malleable metal. This saddle is mounted on the center of the aforesaid elliptic spring, and is adapted to be used on any other crowning spring. It is secured to the spring only at the center of its length either by a bolt or rivet, $c$, passing vertically through the saddle and spring, or by a clip, $c'$, embracing the saddle and spring, as shown in Figs. 6 and 7 of the drawings. When attached by the single bolt or rivet $c$, I form the saddle with a vertically-elongated eye, $h$, as shown in Fig. 3 of the drawings, through which eye the aforesaid bolt or rivet passes. The bearing $e$ of the saddle upon the spring I terminates in proximity to the center of the saddle, so as to reduce the length of said bearing to a minimum, and thus allow the spring to exert its elasticity nearly or quite throughout its length. Said bearing I form with longitudinal flanges $f\,f$, which I clinch onto the edges of the spring, so as to effectually grip the same and prevent it from turning on the bolt or rivet $c$. From the ends of the bearing $e$ extend in opposite directions elongated horizontal arms $l\,l$, which form bearings for supporting either a wagon-seat or other superposed part of a vehicle.

Having described my invention, what I claim as new, and desire to secure by Letters Patent, is—

The combination of the graduated elliptic spring, consisting of the leaves $a\ a$, having their end portions curved reverse from the central portion and lying contiguous to each other and rigidly united thereat, and the saddle $b$, formed with the spring-bearing $e$, longitudinal flanges $f\ f$ on said bearing, the eye $h$ at the center, longitudinal supporting-arms $l\ l$, extending from the central bearing, $e$, and the bolt or rivet $c$, passing through said eye and spring, substantially as described and shown.

In testimony whereof I have hereunto signed my name, in the presence of two witnesses, at Nyack, in the county of Rockland, in the State of New York, this 1st day of December, 1888.

EDWARD CLIFF. [L. S.]

Witnesses:
ALFRED GRIMM,
WM. J. GREEN.